Feb. 28, 1967 E. J. ZEITZ ETAL 3,307,084
CORRIDOR ASSEMBLY FOR AN ELECTROCHEMICAL DEVICE
Filed Feb. 25, 1964
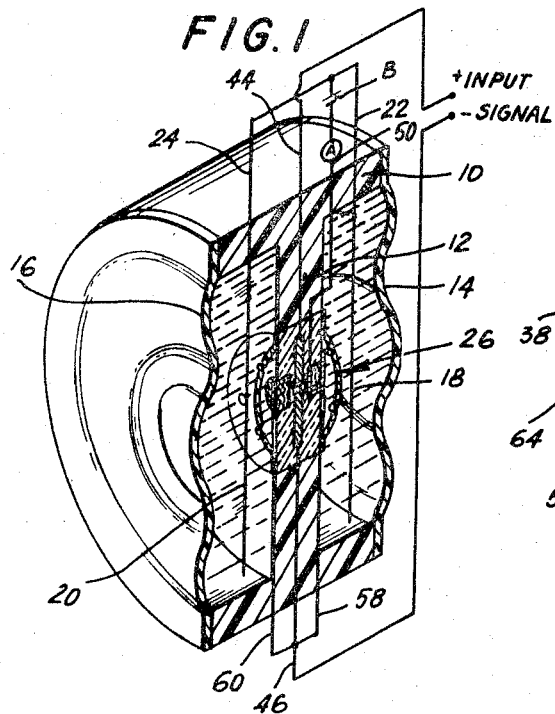
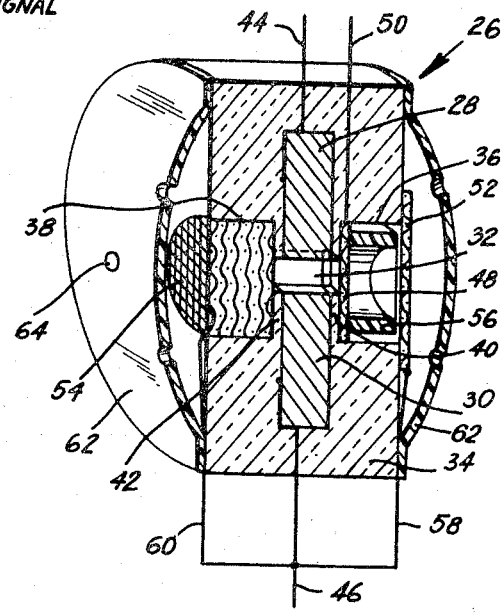
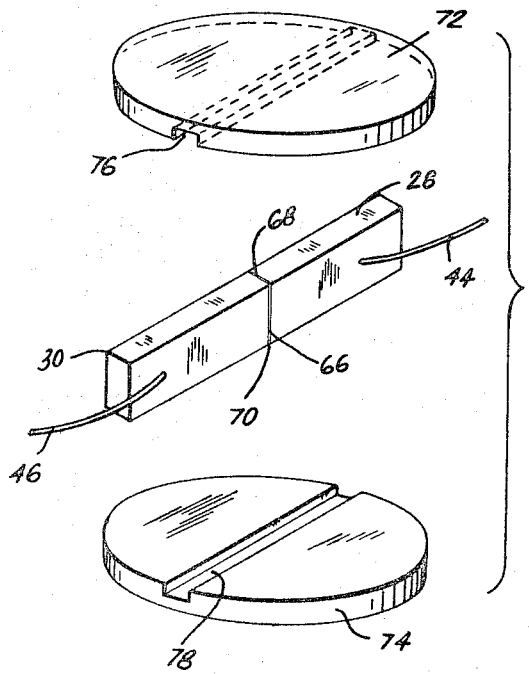
INVENTORS
EDWARD J. ZEITZ
BY DEMETRIOS V. LOUZOS
Henry A. Marzullo Jr.
ATTORNEY United States Patent Office 3,307,084
Patented Feb. 28, 1967

3,307,084
CORRIDOR ASSEMBLY FOR AN ELECTRO-
CHEMICAL DEVICE
Edward J. Zeitz, Parma Heights, and Demetrios V.
Louzos, Rocky River, Ohio, assignors to Union Carbide Corporation, a corporation of New York
Filed Feb. 25, 1964, Ser. No. 347,175
7 Claims. (Cl. 317—230)

This application is a continuation-in-part of U.S. Serial No. 52,249, by E. J. Zeitz and D. V. Louzos, filed August 26, 1960, now abandoned. This invention relates in general to a family of newly developed electrochemical devices commonly known as "solions," and more particularly it relates to an improved corridor assembly for such devices.

One member of the recently developed family of devices is an electrochemical detector. The basic principles of such devices are described in a paper by Hurd and Lane "Principles of Very Low Power Electrochemical Control Devices," Journal of the Electrochemical Society, volume 104, No. 12, December 1957. Detectors of the solion type convert signals such as acoustical pressure into electric current. One type of detector has the property that it indicates the product of two signals applied to the device, one of which is an electrical impulse and the other of which is a signal such as an acoustical pressure. This type is called an electrochemical product detector. It comprises generally a housing divided into two compartments, one wall of which compartment is a flexible diaphragm. The other wall is a common partition having an aperture in which is mounted a pair of oppositely charged electrodes, usually composed of platinum bars separated by a small corridor or gap through which liquid is transferred from one compartment to the other. The electrodes are connected to an external circuit through which a direct current electrical impulse is delivered to the device, one of the electrodes being made a reducing cathode in the circuit, the other being a generating anode. Both compartments are filled with a liquid electrolyte containing a reversible redox system and in each compartment is an electrode which is made an anode in a biasing circuit. Adjacent to one end of the corridor in one of the compartments is a sensing electrode which is biased negative in respect to the anode in each compartment. A scavenging electrode is positioned in the vicinity of each end of the corridor and serves to reduce any stray species of the redox system within each compartment and thereby prevents such species from entering the corridor during operation of the device. When properly biased, a reaction occurs at the electrodes within the corridor. A measured species of the redox system is reduced at the reducing cathode and is formed at the generating anode. The rate of reaction is proportional to the current flowing between the electrodes. Now, if a signal such as an acoustical pressure is provided on the flexible diaphragm defining the wall of the compartment opposite to that containing the sensing electrode, the solution in that compartment tends to flow through the corridor between the electrodes, thereby forming a greater quantity of the measured species at the generating anode. The measured species of the redox system are then swept outside of the corridor and reduced at the sensing electrode. The rate of reduction at the sensing electrode is measured by an electrical current produced in the biasing circuit and indicated on an ammeter, which electrical current indicates the product of both the electrical impulse and the signal such as an acoustical pressure applied to the device. Hence, the device is referred to as a "Product Detector."

In product detectors and other electrochemical devices, such as an integrator unit, full wave linear detector and amplifier units which employ a corridor assembly, it has been heretofore extremely difficult to form and maintain a gap of the proper width between two platinum bars. Furthermore, the body or frame of the prior art corridor assemblies are invariably composed of plastic, for example, which plastic was molded around the platinum bars to hold them in place. The maintenance of the gap between the platinum bars constituting the corridor at a predetermined width is absolutely critical to the sensitivity of most "solion" devices, hence the plastic body which was sensitive to temperature changes did not maintain the proper separation or gap between the electrodes. Generally, the width of the corridor should be within a range of from 1 to 6 mils, for example. It has been found that the aforementioned corridor assembly and method of constructing same was not satisfactory to the maintenance of the proper location of the platinum bars particularly since it is extremely difficult to hold the platinum bars as precisely as required during manufacture when the corridor assembly is subjected to both mechanical and thermal shock. Further, the plastic material of which the corridor assembly has been made has not been sufficiently rigid to insure the proper alignment of the platinum bars during the life of the aforementioned "solion" devices.

It is therefore the principal object of the invention to provide an improved corridor assembly for an electrochemical device (solion) which is capable of more accurate and simple manufacture, more uniform and sensitive performance and which is insensitive to temperature changes.

It is another object of the invention to provide a method for the manufacture of such a corridor assembly.

The invention by means of which these objects are achieved is an improved corridor assembly for use in a "solion," which comprises a pair of bar electrodes separated by a gap of a predetermined width constituting the corridor and a body or frame composed of glass within which the electrodes are rigidly located. The glass frame has holes drilled on each of its sides to a depth sufficient to leave a thin layer of glass at the bottom of the holes to insulate the electrodes. The holes are open to the corridor between the electrodes. A sensing electrode is mounted within one of these holes in juxtaposition to the corridor and at the opening to each hole is located a scavenging electrode.

The invention will now be described more fully with reference to the accompanying drawing, in which:

FIG. 1 is an isometric view, part being broken away, of a typical product detector unit employing a corridor assembly of the invention;

FIG. 2 is a similar view greatly enlarged of the corridor assembly provided in the device of FIG. 1; and FIG. 3 is an exploded view greatly enlarged of the corridor assembly parts prior to being assembled.

Referring now to the drawings and particularly to FIG. 1, a typical solion product detector is illustrated long with the corridor assembly of the invention, which comprises a housing 10 divided into two compartments by an apertured partition 12, each of the compartments having as one wall thereof one of a pair of flexible diaphragms 14, 16. Both compartments of the device are filled with an electrolyte solution containing a reversible redox system, and in each compartment is one of a pair of electrodes 18, 20 connected to a biasing circuit including a biasing battery B through leads 22, 24, respectively, the electrodes 18, 20 being made anodes of the device.

The corridor assembly, indicated generally at 26, is positioned in the aperture of the partition 12 and, as best shown in FIG. 2, comprises a pair of electrodes 28, 30 composed of platinum bars, the ends of which are separated by a gap 32, and a disc shaped frame 34 composed of glass within which the electrodes 28, 30 are rigidly mounted. The gap 32 between the electrodes 28, 30 is of a predetermined width generally within the range of from about 1 to 6 mils and constitutes the corridor. Frame 34 has holes 36, 38 drilled centrally on each of its sides to a depth sufficient to leave a thin layer of insulation 40, 42 adjacent to the sides of the electrodes 28, 30. The holes 36, 38 in the frame 34 communicate with the corridor 32 and transfer of liquid from one compartment to the other takes place solely through the holes 36, 38 and the corridor 32.

The electrodes 28, 30 are connected in series with a source of an electrical input signal through leads 44, 46, respectively, the electrode 28 being made the generating anode and the electrode 30 being the reducing cathode of the device. A sensing cathode 48 composed of platinum gauze or screen is positioned within one of the holes 36 in the frame 34 in juxtaposition to the corridor 32, but insulated from the electrodes 28, 30 by the thin layer 40 of glass insulation adjacent to the electrodes. The sensing cathode 48 is connected to the biasing circuit through a lead 50 and an ammeter A, and is biased negative in respect to the electrodes 18, 20. Adjacent to each hole 36, 38 in the glass frame 34 is one of a pair of scavenging electrodes 52, 54. The scavenging electrodes 52, 54 may suitably be composed of platinum gauze or screen. Between the scavenging electrode 52 and a sensing cathode 48 positioned in the hole 36 is a non-conductive retaining member 56, suitably of plastic. The scavenging electrode 54 as best shown in FIG. 2, preferably provides a plurality of electrode surfaces (zig-zag form) for scavenging all of the measured species of the redox system as it flows through same. It is not necessary for the scavenging electrode 52 to provide such a long path inasmuch as this region or compartment of the unit where the electrode is disposed is not nearly as critical as the opposite zone. Both of the scavenging electrodes 52, 54 are connected in parallel with the reducing cathode 30 through leads 58, 60, respectively. As noted previously, the scavenging electrodes serve to reduce any stray species of the redox system within each compartment and thus they prevent such species from entering the corridor 32. A baffle 62 composed of a sheet of plastic, such as poly-trifluoro-monochloroethylene, having a plurality of apertures 64 therein is positioned to each side of the corridor assembly and suitably sealed at its periphery to the glass frame 34. The baffle 62 is provided to minimize the effects of fluid eddy currents which may occur when a signal such as an acoustical pressure is applied to the device.

It will be appreciated that a corridor assembly as described above provides a rigid structure by which accurate alignment, parallelism, location of electrodes and the corridor therein may be maintained throughout the manufacture and life of the electrochemical device it is utilized in, whether it is a product detector, integrator, full wave linear detector, etc. It is especially to be noted, as will become more apparent hereinafter, that the glass body within which the separated electrodes of the corridor construction are mounted is extremely rigid and provides for an excellent and permanent bond with the electrodes, thereby insuring the stability of the electrochemical device throughout its operation.

The materials of which the corridor assembly is made are important and must be inert to the liquid electrolyte employed by the particular electrochemical device embodying the corridor assembly of the invention. The preferred material for the body is composed of is "Lime Glass," such as "Corning 0088" available from the Corning Glass Company. Lime glass is a glass commonly known in the art and has a composition substantially as follows: 20 percent sodium oxide, 5 percent calcium oxide and 75 percent silica. Lime glass is preferred because it possesses a coefficient of expansion of $92 \times 10^{-7}$ in./° C. (0–300° C.) which is nearly identical to that of platinum and since it is of an extremely high purity. It also possesses excellent bonding properties. Other important properties follow: softening point (700° C.), annealing point (521° C.), strain point (480° C.), specific gravity (2.47), refractory index (Na–R–1.512). Any glass which may be developed in the future and which possesses like properties can of course be utilized in the practice of the invention. Platinum, as mentioned, is the preferred material for the electrodes, but other noble metals such as, for example, iridium, osmium, rhodium and ruthenium may be used as well. Certain metal carbides, such as tantalum carbide, of the type disclosed in the application of R. A. Powers et al., Serial No. 324,275, filed Nov. 18, 1963, may also be used for the electrodes.

Referring now particularly to FIG. 3, a corridor assembly embodying the invention may be made as follows: A pair of platinum bar electrodes 28, 30 of a size approximately 0.040 x 0.075 x 0.200 inch having wire leads 44, 46 welded, soldered or otherwise secured to them are provided. A metal shim 66 composed of a consumable metal, for example, a nickel-chromium alloy, iron or chromium and having a thickness which coincides with the width of the gap or corridor desired, say for example 5 mils, is welded between the ends of the bar electrodes 28, 30. The metal shim 66 is of a length sufficient to provide edges 68, 70 which protrude beyond two opposite sides of the platinum bar electrodes 28, 30. The other edges of the metal shim 66 lie substantially flush with the bar electrodes 28, 30. The metal shim 66 may be of a size, for example, of approximately 0.040 x 0.090 x 0.005 inch. A pair of glass discs 72, 74 preferably composed of lime glass of a size approximately ½ inch in diameter and ⅛ inch thick are provided on each side of the platinum bar electrodes 28, 30. The glass discs 72, 74 have diametrical slots 76, 78, respectively, provided therein of a width corresponding to the thickness of the platinum bar electrodes 28, 30. The glass discs 72, 74 are pressed together in a mold with the platinum bar electrodes 28, 30 being tightly received within the corresponding slots 72, 74. It is important to note that the protruding edges 68, 70 of the metal shim 66 are exposed slightly beyond the sides of the platinum bar electrodes 28, 30, say approximately 0.007 inch, when the glass discs 72, 74 are assembled. The assembled unit in the mold is then placed in a furnace and heated to a temperature sufficient to fuse the glass discs 72, 74 together and to form a frame molded around the platinum bar electrodes 28, 30. The fused assembly is then removed from the furnace and allowed to cool slowly to avoid strains in the glass.

A hole approximately ⅙ inch in diameter is then drilled centrally on each side of the glass frame to a depth sufficient to leave a thin layer of glass insulation adjacent to the sides of the bar electrodes 28, 30. The edges 68, 70 of the metal shim 66 protrude sufficiently beyond the sides of the bar electrodes 28, 30 to be exposed at the bottom of each hole after they are drilled. The metal shim 66 is then dissolved in an acid bath of aqua regia, while an electrical current is passed through the bar electrodes 28, 30 from a 1½ volt No. 6 dry cell battery. The metal shim 66 may also be dissolved more slowly by leaching with a solution of aqua regia (1 volume concentrated $HNO_3$ and 3 volumes HCl). Thus, after the metal shim 66 has been dissolved, a gap or corridor is left between the platinum bar electrodes 28, 30 of the predetermined width desired. A sensing electrode and a pair of scavenging electrodes are then mounted in juxtaposition with the drilled holes of the corridor assembly.

A number of corridor assemblies embodying the invention made in the above described manner have been particularly utilized in product detectors of the type illustrated in FIG. 1 and have exhibited long shelf life. In tests with these devices, the corridor assembly of the invention has been subjected to a variety of conditions and has consistently proved to yield a uniform and sensitive response throughout its operation.

It will be apparent to those skilled in the art that a variety of modification of the corridor assembly described herein are possible and may be made without departing from the spirit and scope of the invention.

We claim:

1. A corridor assembly for use in an electrochemical device, which comprises a body and a pair of bar electrodes mounted within said body, the ends of which electrodes are separated by a corridor between them of a predetermined width, said body being composed of lime glass and being fused to and molded around said electrodes, said body having a cavity penetrating each of its sides with a surface of said glass adjacent each side of said electrodes forming the bottom wall thereof, and a hole through said surface communicating with said corridor, a sensing electrode mounted in one of said cavities and adjacent the hole in its bottom wall, and a scavenging electrode disposed in close proximity to the opening of each of said cavities.

2. The corridor assembly of claim 1 wherein a baffle is positioned on each side of said body.

3. A method of making a corridor assembly for an electrochemical device, which comprises providing a pair of bar electrodes, welding a consumable metal shim between the ends of said electrodes, said metal shim having a predetermined thickness coinciding with the width of a gap to be produced between said electrodes constituting a corridor and having edges which protrude beyond two opposite sides of said electrodes, placing a disc composed of glass with a groove therein receiving said electrodes on each of their sides, fusing said discs together to form a body molded around said electrodes, drilling a hole on each side of said glass body to a depth therein sufficient to provide a thin layer of glass adjacent said electrodes and to expose the protruding edges of said metal shim, and dissolving said metal shim thereby forming a hole through said layer and a corridor between said electrodes.

4. The method defined by claim 3 in which said metal shim is composed of a material selected from the group consisting of a nickel-chromium alloy, iron and chromium.

5. The method defined by claim 3 in which said metal shim is dissolved in an acid bath of aqua regia while passing an electrical current through said bar electrodes.

6. The method defined by claim 3 in which said metal shim is dissolved by leaching in a solution of aqua regia.

7. A product detector unit, which comprises a housing including two compartments and an apertured partition therebetween, each of said compartments having as one wall thereof one of a pair of flexible diaphragms, said compartments containing an electrolyte solution of a reversible redox system, a pair of electrodes communicating with a biasing circuit having a battery, and a corridor assembly; said corridor assembly comprising a body and a pair of bar electrodes mounted within said body, the ends of which electrodes are separated by a corridor between them of a predetermined width, said body being composed of lime glass and being fused to and molded around said electrodes, said body having a cavity penetrating each of its sides with a surface of said glass adjacent each side of said electrodes forming the bottom wall thereof, and a hole through said surface communicating with said corridor, a sensing electrode mounted in one of said cavities and adjacent the hole in its bottom wall, and a scavenging electrode disposed in close proximity to the opening of each of said cavities.

No references cited.

J. D. KALLAM, *Primary Examiner.*